United States Patent
Hashirayama et al.

(10) Patent No.: US 6,308,974 B1
(45) Date of Patent: Oct. 30, 2001

(54) SUSPENSION SYSTEM

(75) Inventors: Kenji Hashirayama; Yoshihisa Nakamura, both of Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/134,696

(22) Filed: Aug. 14, 1998

(30) Foreign Application Priority Data

Dec. 11, 1997 (JP) .................................................... 9-361676

(51) Int. Cl.$^7$ ........................................................ F16F 1/12
(52) U.S. Cl. ............................ 280/124.162; 280/124.179; 267/34; 267/286; 267/179
(58) Field of Search .................... 280/124.179, 124.162, 280/124.164, 124.1; 267/231, 248, 34, 286, 179

(56) References Cited

U.S. PATENT DOCUMENTS

| | | | |
|---|---|---|---|
| 1,005,171 | * 10/1911 | Dearing | 280/124.179 |
| 2,030,710 | * 2/1936 | Opolo | 280/124.179 X |
| 3,414,278 | * 12/1968 | Schmid | 280/124.162 X |
| 4,341,397 | * 7/1982 | Morimura et al. | 280/124.179 X |
| 4,534,580 | * 8/1985 | Kobayashi et al. | 280/124.162 X |
| 4,997,201 | * 3/1991 | Schaible | 280/124.179 X |
| 5,470,049 | * 11/1995 | Wohler et al. | 267/179 |
| 5,620,171 | * 4/1997 | Wakatsuki | 267/179 |
| 5,676,355 | * 10/1997 | Hayashi et al. | 267/179 |

FOREIGN PATENT DOCUMENTS 6325217   5/1988   (JP) .

* cited by examiner

Primary Examiner—J. J. Swann
Assistant Examiner—F. Zeender
(74) Attorney, Agent, or Firm—Orum & Roth

(57) ABSTRACT

A suspension system 10 has one or more protrusive seating portions 21L;22L, on which a coil spring 13 is situated, and is formed in a partly circumferential portion of a spring seat 14L supporting the coil spring 13, and a tapered surface 23L for preventing body warp or bending of the coil spring 13 in a circumferential portion of at least one protrusive seating portion 22L.

10 Claims, 4 Drawing Sheets

SUSPENSION SYSTEM

BACKGROUND OF THE INVENTION

1. Field of the Invention

The present invention relates to a suspension system which is interposed between a vehicle body and an axle, and has a coil spring.

2. Description of the Related Art

Conventionally, in an assembly state of a suspension system before being mounted to a vehicle, a coil spring is slightly compressed and is interposed between a lower spring seat mounted on a damper cylinder and an upper spring seat mounted on a piston rod. In the case of mounting the suspension system, which is in the aforesaid assembly state to the vehicle, a lower portion of the damper cylinder is connected to an axle side mounting portion, and then, the upper spring seat mounted on the piston rod is connected to a vehicle body side mounting portion.

However, the coil spring assembled into the suspension system usually causes a curvature of its belly due to eccentricity of a load to the center axis of the coil spring. The body warp of the coil spring is a factor of tilting the upper spring seat to the center axis of the suspension system. In order to mount the suspension system having a tilted upper spring seat, to the vehicle, the upper spring seat is flush with a surface of the vehicle body side mounting portion, and because of this, the lower portion of the damper cylinder greatly diverges from the axle side mounting portion; for this reason, it is very difficult to mount the suspension system to the vehicle.

In order to prevent body warp of the spring coil after the suspension system is mounted to the vehicle (not assembly state before being connected to the vehicle), there has been proposed the invention shown in Japanese Patent Application Publication (JP-B) No. 63-25217, as prior art. This Publication discloses the technique of fitting a tilted-surface annular spacer into the spring seat in a direction to compress a convex portion side of the body warp of the coil spring. The aforesaid prior art is applied to the suspension system which is in an assembly state before being connected to the vehicle. However, in the prior art, a tilted surface is provided on the overall circumferential direction of the spring seat so that the entire circumferential portion of the coil spring is in contact with the tilted surface. As a result, a compressive force is applied to the coil spring over the circumferential portion of the coil spring. For this reason, a compressive force is applied to the convex portion side of the body warp of the coil spring to some degree. This creates the possibility of producing a body warp in the coil spring, and consequently, the body warp of the coil spring is not prevented. Further, in the prior art, the annular spacer is fitted into the spring seat; for this reason, the number of components is increased, and also, assembly is more difficult.

SUMMARY OF THE INVENTION

The present invention has been made taking the aforesaid problem of the prior art into consideration. Therefore, an object of the present invention is to provide a simple suspension system which can prevent a body warp of a coil spring in an assembly state before the suspension system is mounted on a vehicle.

To achieve the above object, the present invention provides a suspension system which is interposed between a vehicle body and an axle, and has a coil spring, which comprises:

one or more protrusive seating portions, on which the coil spring is situated, and formed partly in a circumferential direction of a spring seat supporting the coil spring; and a taper surface for preventing a body warp of the coil spring in a circumferential direction of at least one protrusive seating portion.

BRIEF DESCRIPTION OF THE DRAWINGS

The present invention will be understood nmore fully from the detailed description given hereinbelow and from the accompanying drawings of the preferred embodiments of the invention.

In the drawings.

DESCRIPTION OF THE PREFERRED EMBODIMENTS

Figure 1:
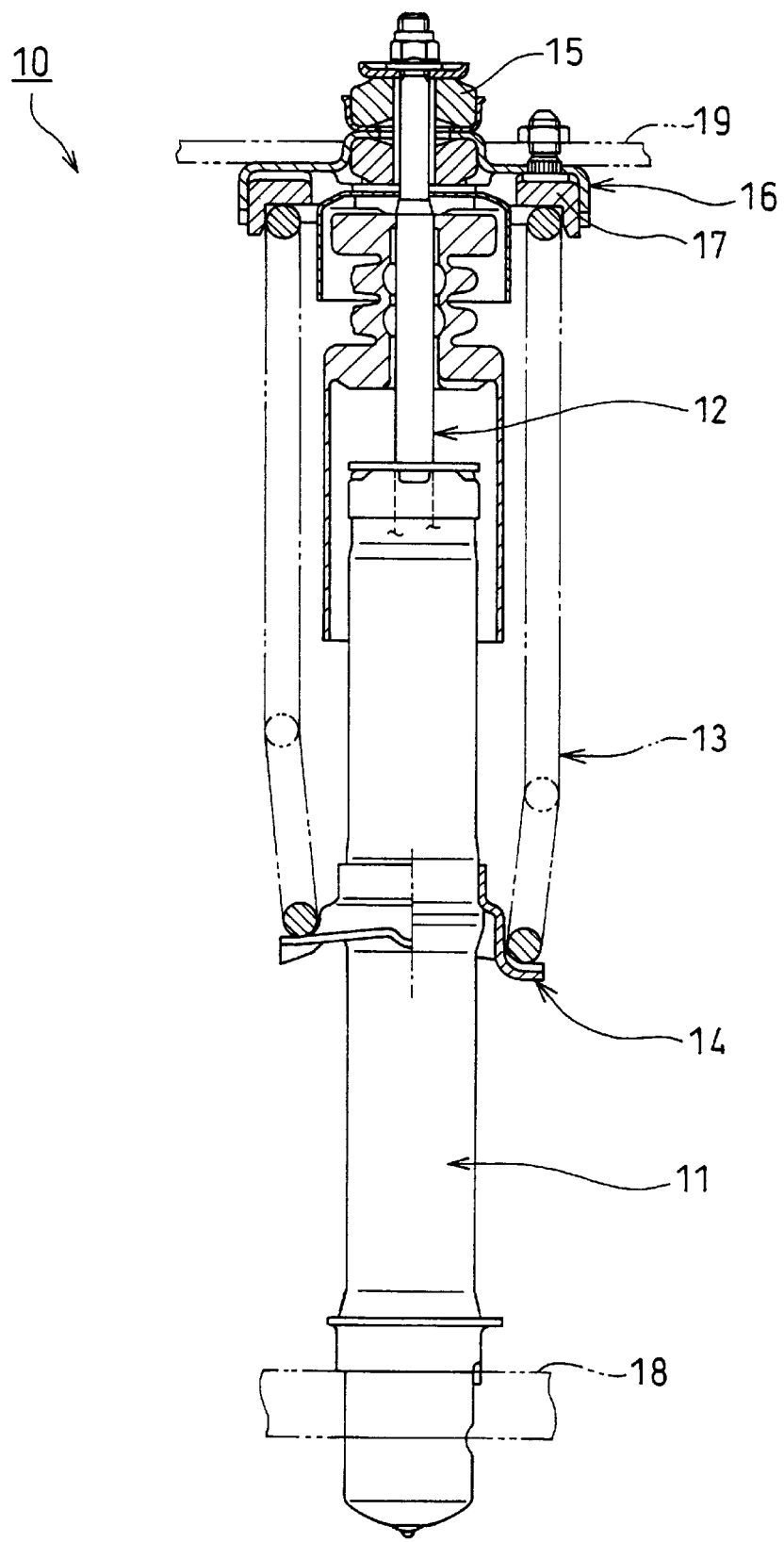
FIG. 1 is a view showing a suspension system according to one embodiment of the present invention.
Figure 2:
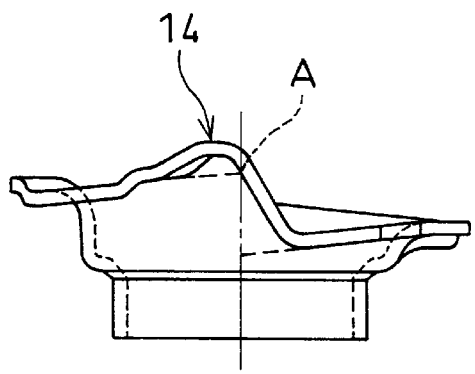
FIG. 2 is a view showing a spring seat.
Figure 3:
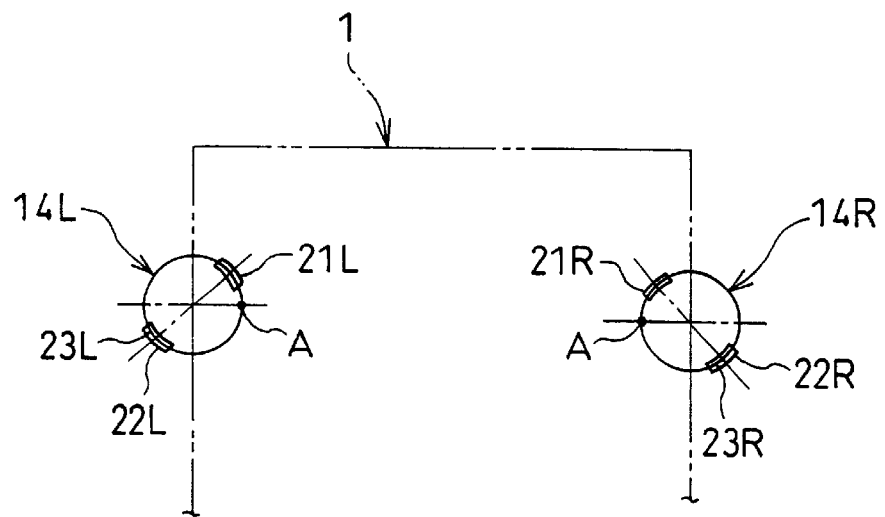
FIG. 3 is a view showing an arrangement of the spring seat in a vehicle, and showing a body warp state of the coil spring.
Figure 3:
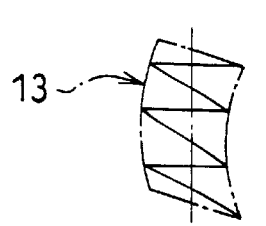
Figure 3:
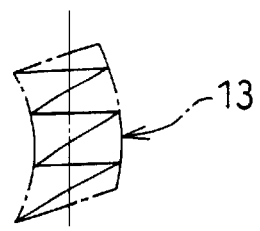
Figure 3:
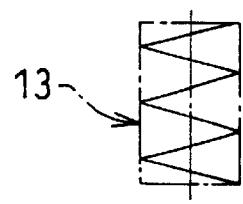
Figure 3:
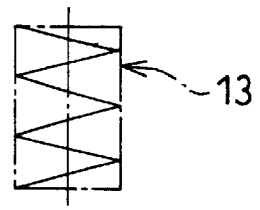

As shown in FIG. 1, a suspension system 10 has a damper cylinder 11, a piston rod 12 and a coil spring 13, and is constructed in a manner that a lower spring seat 14 is attached to an outer peripheral portion of the damper cylinder 11, and an upper spring seat 16 is attached to the piston rod 12 via a rubber mount 15. The assembly state of the suspension system 10 before mount to the vehicle, is established in a manner that the coil spring 13 is interposed between the lower spring seat 14 and the upper spring seat 16 in a state of being slightly compressed. Also, the upper spring seat 16 supports the coil spring 13 via the rubber mount 17.

The suspension system 10 is connected to the vehicle in a manner that the lower portion of the damper cylinder 11 is mounted to an axle side mount portion 18, and the upper spring seat 16 attached to the piston rod 12 is mounted to a vehicle body side mounting portion 19.

In the suspension system 10, in order to prevent a body warp of the coil spring 13 in the assembly state before attachment to the vehicle, the lower spring seat 14 is constructed as described below. In the following description, the left-side lower spring seat is identified as 14L, and the right-side lower spring seat is identified as 14R. In this case, additional characters L and R are given to components relative to the spring seat 14L and spring seat 14R. At this time, right and left side coil springs are both left hand wound.

(Left-side Spring Seat 14L) (FIG. 3, FIGS. 4A to 4C)

Figure 4A:
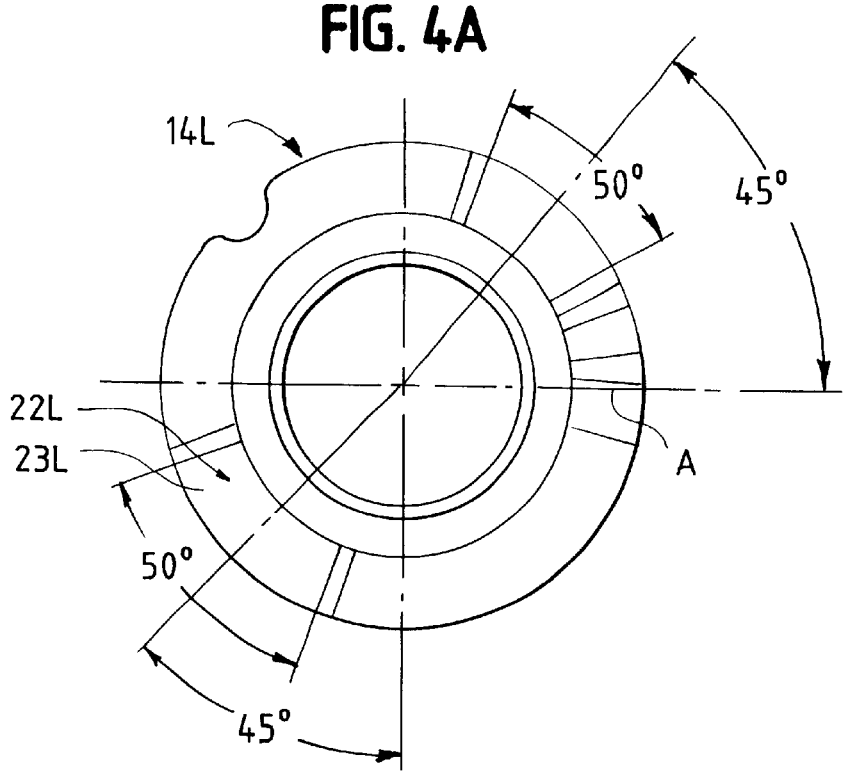
FIG. 4A, FIG. 4B and FIG. 4C are views showing a left-side spring seat in the vehicle.

As shown in FIG. 4A, a left-side spring seat 14L is provided with protrusive seating portions 21L (see FIG. 4B) and 22L (see FIG. 4C) on which the coil spring 13 circumference is partly in contact, at relatively facing two positions around the center of the spring seat 14L. In this case, an end seating position A of the left-hand wound coil spring 13 is arranged so as to be situated in an inner side of a vehicle body 1, and protrusive seating portions 21L and 22L are arranged at a position forming an angle of 45° to a front and back direction line of the vehicle body (see FIG. 3).

In the left-side spring seat 14L, a taper surface 23L is provided on the protrusive seating portion 22L formed on a side where there is a convex portion in the body warp of the coil spring 13 with respect to the center of the spring seat 14L, that is, outside the vehicle body 1 in this embodiment. The taper surface 23L of the protrusive seating portion 22L has an increasing grade toward the side where there is a convex portion in the body warp of the coil spring 13, that is, to the outside direction (clockwise direction) of the vehicle body 1 in the protrusive seating portion 22L of this embodiment. Thereby the body warp of the coil spring 13 can be prevented. In a taper surface 23L of the protrusive seating portion 22L shown in FIG. 4C, one end level of the taper surface 23L is 2.6 mm; the other end level thereof is 3.6 mm, and therefore, the increasing grade is 1.0 mm.

Figure 4B:
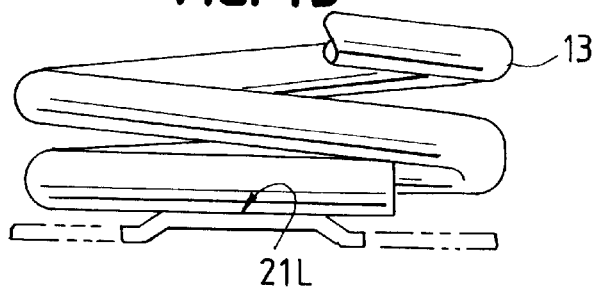
Figure 4C:
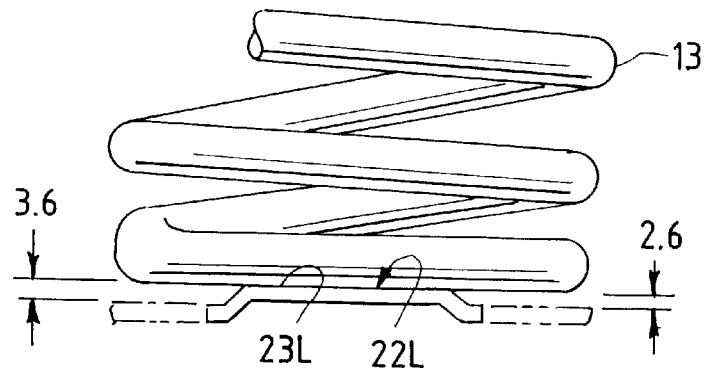

The protrusive seating portion 21L of the left-side spring seat 14L has a flat surface, and does not include a taper surface (see FIG. 4B).

(Right-side Spring Seat 14R)(FIG. 3, FIGS. 5A to 5C)

Figure 5A:
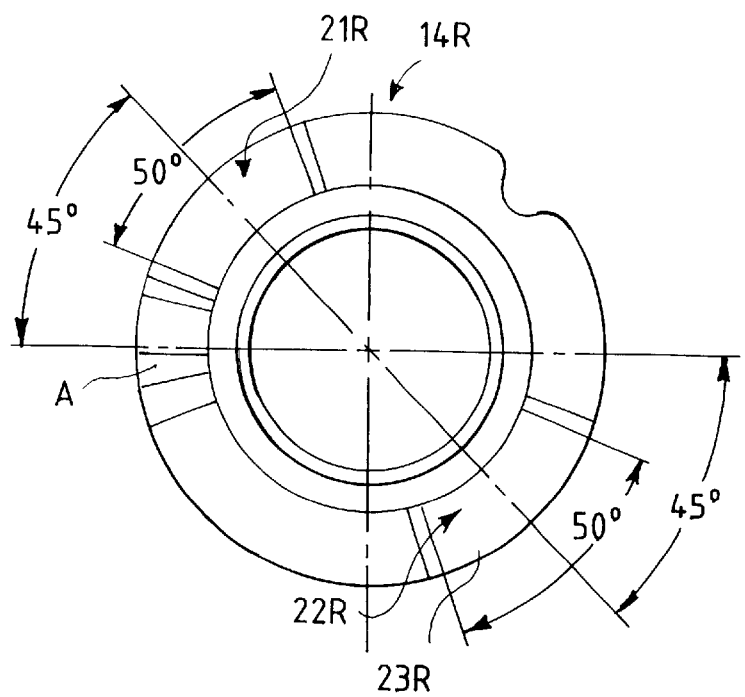
FIG. 5A, FIG. 5B and FIG. 5C are views showing a right-side spring seat in the vehicle.
Figure 5B:
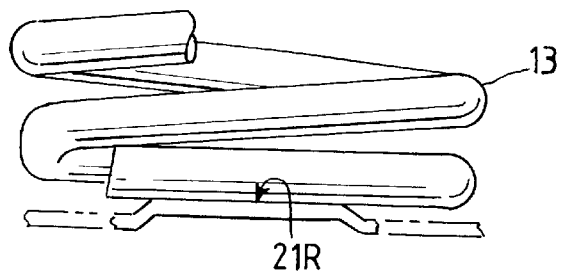
Figure 5C:
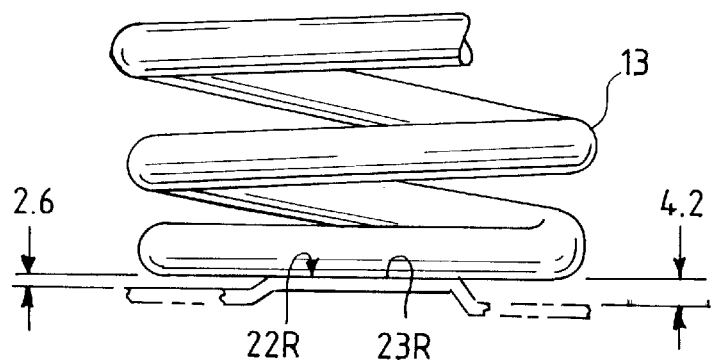

As shown in FIG. 5, a right-side spring seat 14R is provided with protrusive seating portions 21R (see FIG. 5B) and 22R (see FIG. 5C) on which the coil spring 13 circumference is partly in contact, at relatively facing two positions around the center of the spring seat 14R. In this case, an end seating position A of the left-hand wound coil spring 13 is arranged so as to be situated in an inner side of a vehicle body 1, and protrusive seating portions 21R and 22R are arranged at a position forming an angle of 45° to a front and back direction line of the vehicle body (see FIG. 3).

In the right-side spring seat 14R, a taper surface 23R is provided on the protrusive seating portion 22R formed on a side where there is a convex portion in the body warp of the coil spring 13 with respect to the center of the spring seat 14R, that is, outside the vehicle body 1 in this embodiment. The taper surface 23R of the protrusive seating portion 22R has an increasing grade toward the side where there is a convex portion in the body warp of the coil spring 13, that is, to the inside direction (counterclockwise direction) of the vehicle body 1 in the protrusive seating portion 22R of this embodiment. Thereby the body warp of the coil spring 13 can be prevented. In a taper surface 23R of the protrusive seating portion 22R shown in FIG. 5C, one end level of the taper surface 23R is 2.6 mm; the other end level thereof is 4.2 mm, and therefore, the increasing grade is 1.6 mm.

The protrusive seating portion 21R of the left-side spring seat 14R has a flat surface, and does not include a taper surface (see FIG. 5B).

In the left-side spring seat 14L and the right-side spring seat 14R, the coil springs 13 supported on these spring seats are both left hand wound, and the protrusive seating portions 21L;22L and 21R;22R are provided symmetrically around the center line of the vehicle body 1 in a manner that the end position A of the coil spring 13 is arranged on the vehicle body 1 side, protrusive seating portions 21L;22L and 21R;22R are arranged at a position of making an angle of 45° to a front and back direction line of the vehicle body, and protrusive seating portions 22L and 22R are arranged outside the vehicle body. Thus, the coil spring 13 on the left spring seat 14L side and the coil spring 13 on the right spring seat 14R side are different from each other with respect to length from the end seating position A supported on the protrusive seating portions 22L and 22R. As a result, the grade (1.0 mm) of the taper surface 23L of the protrusive seating portion 22L and the grade (1.6 mm) of taper surface 23R of the protrusive seating portion 22R are different from each other, so that these coil springs 13 can have a sufficiently and equivalently body warp preventive effect.

If the protrusive seating portions 21L;22L of the left-side spring seat 14L and the protrusive seating portions 21R;22R of the right-side spring seat 14R are arranged symmetrically around the vehicle body, and the coil spring 13 on the left-side spring seat 14L side and the coil spring 13 on the right-side spring seat 14R side are counterclockwise wind, the coil spring 13 on the left-side spring seat 14L side and the coil spring 13 on the right-side spring seat 14R side will be the same in the length from the end position supported on the protrusive seating portions 22L and 22R. Thus, the grade of the taper surface 23L of the protrusive seating portion 22L and the taper surface 23R of the protrusive seating portion 22R are equal (e.g., 1.0 mm) to each other, so that body warp preventive effect can be mutually and equally obtained.

The experiments have been made by the inventors of the present invention. These showed that in the case where the left-side spring seat 14L was provided with the protrusive seating portions 21L and 22L, and the protrusive seating portion 22L had no taper surface 23L, the body warp of the left-side coil spring 13 was 10.5 mm in the assembly state of the suspension system 10. On the other hand, in the case where the right-side spring seat 14R was provided with the protrusive seating portions 21R and 22R, and the protrusive seating portion 22R had no taper surface 23R, the body warp of the left-side coil spring 13 was 15.0 mm in the assembly state of the suspension system 10. On the contrary, in the case where the left-side spring seat 14L was provided with the protrusive seating portions 21L and 22L, and the protrusive seating portion 22L had the taper surface 23L whose grade is 1.0 mm, the body warp of the left-side coil spring 13 was 0.2 mm (body warp preventive rate:10.3 mm) in the assembly state of the suspension system 10. On the other hand, in the case where the right-side spring seat 14R was provided with the protrusive seating portions 21R and 22R, and the protrusive seating portion 22R had the taper surface 23R whose grade is 1.6 mm, the body warp of the right-side coil spring 13 was 4.9 mm (body warp preventive rate:10.1 mm) in the assembly state of the suspension system 10. By the construction described, the body warp of the coil spring 13 is prevented.

Therefore, according to this embodiment, the following effects can be obtained.

(1) When the suspension system 10 is in the assembly state, the spring seats 14L and 14R are formed with protrusive seating portions 22L and 22R having taper surfaces 23L and 23R for preventing body warp of the coil spring 13 partly in the circumferential direction thereof, and thereby, it is possible to prevent the body warp of the coil spring 13.

(2) The protrusive seating portions 22L and 22R having taper surfaces 23L and 23R of the spring seats 14L and 14R in the above item (1) are formed only partly in the circumferential direction of the spring seats 14L and 14R to prevent the body warp of the coil spring 13. Thus, it is possible to prevent body warp.

(3) The protrusive seating portions 22L and 22R having taper surfaces 23L and 23R of the spring seats 14L and 14R in the above item (1) are readily formed integrally with the spring seats 14L and 14R by mechanical press or the like, and the construction is simple, the number of components is reduced, to make assembly easier.

(4) The protrusive seating portions 22L and 22R individually have taper surfaces 23L and 23R of the spring seats 14L and 14R in the above item (1). The taper surfaces 23L and 23R individually have an increasing grade toward a side where there is a convex portion in the body warp of the coil spring 13. Thus, it is possible to securely prevent the body warp of the coil spring 13.

(5) The protrusive seating portions 22L and 22R of the spring seats 14L and 14R in the above item (1) are arranged at two facing positions around the center of the spring seats 14L and 14R, and at least one protrusive seating portion 22L;22R is provided with the taper surface 23L;23R. Thus, it is possible to securely prevent body warp of the coil spring 13.

(6) The protrusive seating portions 22L and 22R having taper surfaces 23L and 23R of the spring seats 14L and 14R in the above item (1) are arranged on the side having a convex portion in the body warp of the coil spring 13 with respect to the center of the spring seat 14L;14R. Thus, it is possible to securely prevent body warp of the coil spring 13.

(7) The protrusive seating portions 22L and 22R having taper surfaces 23L and 23R of the spring seats 14L and 14R in the above item (1) are arranged at a position of making an angle of 45° to a front and back direction line of the vehicle body. Thus, the coil spring 13 will resist resonance with a vibration from the axle and with a vibration from an engine.

(8) In the assembly state before the suspension system 10 of the above item (1) is mounted in a vehicle, the body warp of the coil spring 13 is prevented. Thus, it is possible to prevent the upper spring seat in the assembly state from being tilted, and to improve mounting performance of the suspension system 10 to the vehicle.

While the preferred embodiments of the invention have been described in detail with reference to the drawings, they are by no means limitative, and various changes and modifications are possible without departing from the scope and spirit of the invention. For example, in the present invention, the spring seat having the protrusive seating portion is not limited to the lower spring seat, and may be provided on either of the upper or lower spring seat, or may be provided on both upper and lower spring seats.

As described above, according to the present invention, it is possible to stably prevent the body warp of the coil spring in the assembly state before the suspension system is mounted to the vehicle with a simple construction.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A suspension system which is interposed between a vehicle body and an axle, and uses a coil spring, comprising:
   two protrusive seating portions, on which a certain length of a bottom surface of the coil spring is seated, being formed with a certain length partly along with a circumferential direction of a spring seat supporting the coil spring, and
   each of said two protrusive seating portions being formed on each of two separate positions in the circumferential direction of said spring seat, between non-seating portions on which said bottom surface of the coil spring does not contact; and
   said two protrusive seating portions being disposed at two positions facing each other on the same diameter through the center of the spring seat, and
   at least one of the protrusive seating portions being a tapered surface slanting in a circumferential direction of said spring seat for preventing a body warp of the coil spring.

2. The suspension system according to claim 1, wherein the at least one protrusive seating portion of the spring seat having a taper is tapered in an increasing grade toward a side having a convex portion in the body warp of the coil spring.

3. The suspension system according to claim 2, wherein the at least one protrusive seating portion of the spring seat having a taper is disposed on a side where there is a convex portion in the body warp of the coil spring with respect to the center of the spring seat.

4. The suspension system according to claim 2, wherein the at least one protrusive seating portion of the spring seat having a taper is disposed at a position to form an angle of 45° to a front and back axis of the vehicle body passing through the center of the spring seat.

5. The suspension system according to claim 2, wherein the body warp of the coil spring is reduced in an assembly state before the suspension system is attached to the vehicle.

6. The suspension system according to claim 1, wherein the at least one protrusive seating portion of the spring seat having a taper is disposed on a side where there is a convex portion in the body warp of the coil spring with respect to the center of the spring seat.

7. The suspension system according to claim 6, wherein the body warp of the coil spring is reduced in an assembly state before the suspension system is attached to the vehicle.

8. The suspension system according to claim 1, wherein the at least one protrusive seating portion of the spring seat having a taper is disposed at a position to form an angle of 45° to a front and back axis of the vehicle body passing through the center of the spring seat.

9. The suspension system according to claim 1, wherein the body warp of the coil spring is reduced in an assembly state before the suspension system is attached to the vehicle.

10. A suspension system which is interposed between a vehicle body and an axle, and uses a coil spring, comprising:
    two protrusive seating portions, on which an end surface of the coil spring is placed, formed partly in a circumferential portion of a spring seat supporting the coil spring;
    said two protrusive seating portions disposed at two positions facing each other on the same diameter through the center of the spring seat between two non-seating portions which the end surface of the coil spring does not contact;
    at least one of the protrusive seating portions having a taper in a circumferential direction for reducing a body warp of the coil spring.

* * * * *